United States Patent [19]

Layton et al.

[11] Patent Number: 5,097,001
[45] Date of Patent: Mar. 17, 1992

[54] HYDROQUINONE POLY(ISO-TEREPHTHALATES) CONTAINING RESIDUES OF P-HYDROXYBENZOIC ACID

[76] Inventors: Richard Layton, 535 Regent Rd., Augusta, Ga. 30909; James W. Cleary, 2213 Henry St., Neenah, Wis. 54956; Paul J. Huspeni, 1843 Mountside Dr., North Augusta, S.C. 29841; Paul D. Frayer, 408 Hastings Cutoff, Martinez, Ga. 30907

[21] Appl. No.: 412,785

[22] Filed: Sep. 26, 1989

Related U.S. Application Data

[63] Continuation of Ser. No. 255,670, Oct. 11, 1988, abandoned.

[51] Int. Cl.$^5$ ............... C08G 63/02; C08G 63/18; C08J 67/00; C08J 67/02
[52] U.S. Cl. .............................. 528/193; 524/601; 524/604; 524/605; 528/176; 528/179; 528/180; 528/194
[58] Field of Search ............ 528/179, 176, 180, 193, 528/194; 524/601, 604, 605

[56] References Cited

U.S. PATENT DOCUMENTS

4,381,389 4/1983 Irwin .................. 528/193
4,742,149 5/1988 Finestone ............. 528/179

Primary Examiner—Morton Foelak
Assistant Examiner—T. Mosley

[57] ABSTRACT

A high modulus, high strength melt processable copolyester consisting essentially of recurring units (I), (II), (III) and (IV):

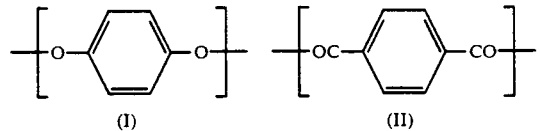

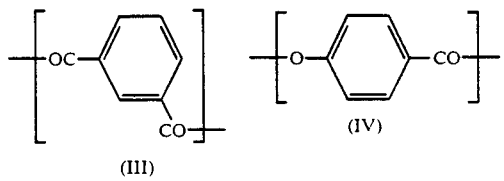

wherein said copolyester has a melting point in the range of from about 340° C. to 400° C., a crystallization temperature of from about 300° C.–340° C., and a crystallization rate of at least 1,000 counts/minute.

14 Claims, 1 Drawing Sheet

HYDROQUINONE POLY(ISO-TEREPHTHALATES) CONTAINING RESIDUES OF P-HYDROXYBENZOIC ACID

This is a continuation of application Ser. No. 225,670, filed Oct. 11, 1988 now abandoned.

FIELD OF THE INVENTION

This invention pertains to novel copolyesters consisting essentially of units (I), (II), (III), and (IV).

Units (I), (II), (III), and (IV) are present in specified proportions as defined in the "Description of the Invention".

The instant copolyesters display high modulus, and high strength; they have melting points in the range of from 340° to 400° C.; are melt-processible, and show orientation in the molten state. Compositions filled with about 30 weight percent of glass fibers display heat distortion temperatures of about 240° C. to about 280° C., when measured under a load of 264 psi.

BACKGROUND OF THE INVENTION

Wholly aromatic polyester resins have long been known. For instance, 4-hydroxybenzoic acid homopolymer and copolymers have been described in the past and are commercially available. Such polymers commonly are crystalline in nature, have relatively high melting points or possess a decomposition temperature which is below the melting point, and when molten frequently exhibit orientation in the melt.

The homopolymer of p-hydroxybenzoic acid is a very high melting, insoluble material and, hence, very difficult to fabricate. Melting points as high as 610° C. were quoted—see W. J. Jackson, The British Polymer Journal, December 1980, p. 155. In order to depress the high melting point of the homopolymer so as to make it melt fabricable, a variety of materials incorporating different types of comonomers were prepared over the years.

One such material is, for example, the resin made from p-hydroxybenzoic acid, isophthalic and/or terephthalic acids and 4,4'-biphenol as described in Cottis et al., U.S. Pat. Nos. 3,637,595 and 3,975,487. The polymer has outstanding high temperature properties; it can be molded to give articles of high modulus and strength. It is offered commercially by Amoco Performance Products, Inc. under the trade name of Xydar ®.

The main drawback of the prior art p-hydroxybenzoic acid copolymers is the relatively high cost associated with the use of an expensive comonomer, such as 4,4'-biphenol, substituted hydroquinones (e.g., phenylhydroquinone), naphthalene diols, naphthalene dicarboxylic acids, and hydroxy-naphthoic acids. Efforts to replace these expensive monomers with the significantly less expensive hydroquinone, which is disclosed as an equivalent of biphenol in the aforementioned U.S. Pat. Nos. 3,637,595 and 3,975,487, were made by several research groups. To date, none of these investigations were successful.

Study of the prior art shows that replacement of 4,4'-biphenol with hydroquinone leads to materials with inferior properties. The problem created by the introduction of hydroquinone is basically the following: at high terephthalate contents, high melting generally intractable polymers are obtained; tractability may be achieved at higher isophthalate levels, but the polyesters are relatively low melting and often display low second order glass transition temperatures which lead to low moduli and low heat distortion temperatures. For example, polyesters from p-hydroxybenzoic acid (PHBA) isophthalic acid (IA) and hydroquinone (HQ) were prepared by Deex, U.S. Pat. No. 4,377,681. At mole ratios PHBA/IA/HQ of 33.3/33.3/33.3 the material had a glass transition temperature of 110° C.; when the above coreactants were used at ratios of 50/25/25, a Tg of 115° C. was obtained.

The high melting points of a series of p-hydroxybenzoic acid/terephthalic acid/hydroquinone copolymers are graphically illustrated in FIG. 2 of the paper by G. W. Calundann, titled "Industrial Development of Thermotropic Polyesters", published in "High Performance Polymers: Their Origin and Development", R. B. Seymour and G. S. Kirshenbaum, Editors; pp. 235-249; copyright 1986 by Elsevier Science Publishing Co., Inc. The publication shows clearly (in FIG. 2) that hydroquinone polymers melt at considerably higher temperatures than their 4,4'-biphenol counterparts. The $T_m$ of the lowest melting composition is about 420° C. FIG. 4 of the same publication (p. 243) indicates how one research group was able to depress the melting points of the subject resins by incorporating naphthalene diols, naphthalene dicarboxylic acids, and hydroxy naphthoic acids into them. From a purely technical point of view, the latter approach was a success; however, the modified polymers were still expensive due to the high cost of the naphthalene-based monomers.

The intractability of the hydroquinone-derived materials is discussed in Jackson, et al., U.S. Pat. No. 4,242,496. Column 2, lines 18-26 states:

"U.S. Pat. No. 3,637,595 discloses that aromatic liquid crystal polyesters prepared from terephthalic acid, hydroquinone and varying amounts of p-hydroxybenzoic acid melt in the general range of 800° to 900° F. Obviously, the melting point of these polymers is far too high and the thermal stability is insufficient to permit these polymers to be used in conventional melt-processing equipment."

It is further stated (column 2, lines 33-40) that a solution to the above problem "was to incorporate a substituent on some of the aromatic rings of the polyester, preferably on the diol ring.

For example, it is well known that use of chloro, methyl or ethyl hydroquinone lowers the melting point of the polyester. Although this approach can be used to lower the melting point, typically the mechanical properties are also substantially reduced".

The patent goes on to propose the use of phenyl hydroquinone (an expensive comonomer) as the best way whereby the melting point can be reduced to obtain tractable resins, without adversely affecting the mechanical properties.

As indicated earlier, polyesters forming oriented melts were made from a variety of substituted hydroquinones. See, for example, Lee et al., U.S. Pat. No. 4,600,765; Hutchings et al., U.S. Pat. Nos. 4,614,790 and 4,614,791; and Funakoshi et al., U.S. Pat. No. 4,447,593.

Readily, processible polyesters made from p-hydroxybenzoic acid, isophthalic and optionally terephthalic acid, hydroquinone and 3,4'- and/or 4,4'-biphenol, 3,4'- and/or 4,4'-dihydroxy diphenyl ether, 3,4'- and/or 4,4'-dihydroxy diphenyl sulfide are the subject of Dicke et al., U.S. Pat. No. 4,603,190. It should be recognized that once again an expensive monomer is necessary to obtain tractable melts. Similar situations are encountered in a host of other U.S. and foreign patents. See, for example:
Portugall et al., European Patent Appln. No. EP-257,558;
Hisgen et al., European Patent Appln. No. EP-257,598;
Hisgen et al., German Patent Appln. No. DE-3,629,208;
Hisgen et al., German Patent Appln. No. DE-3,629,210; and
Okamoto et al., World Patent Application No. WO-88/00,955.

As pointed out above, tractable materials result at high isophthalic acid levels but the products typically display undesirably low glass transition temperatures. Deex, U.S. Pat. No. 4,377,681 states (Column 1, lines 31-38):
"For example, liquid crystal copolyesters have been prepared from the following fairly rigid molecular species: p-hydroxybenzoic acid, hydroquinone and isophthalic acid. However, when ratios of the monomers are selected to provide tractable polymers, the glass transition temperature is generally low and the high temperature mechanical properties are reduced".

Attempts to increase the Tg of these products have been made. Thus, Deex, U.S. Pat. No. 4,377,681 claims copolyesters prepared from p-hydroxybenzoic acid, isophthalic acid, hydroquinone and 2,2-bis(4-hydroxyphenyl)propane. The preferred compositions contain from about 20 to about 35 mole percent of p-hydroxybenzoic acid units, and from about 5 to about 12 mole percent of 2,2-bis(4-hydroxy phenyl)propane (bisphenol-A) based on the total diphenol components. Glass transition temperatures of about of 175° to about 190° C. were observed. These values represent an improvement when compared to the Tg's of the polyesters which do not contain the 2,2-bis(4-hydroxyphenyl) propane ($\approx$110° to 115° C.). However, they must be considered low as they lead to heat distortion temperatures (HDT's) which are, at best, of the order of about 120° to 140° C.; moreover, the introduction of bisphenol-A lowers the degree of crystallinity as well as the rate of crystallization; in addition, mold shrinkage of these copolymers is unsatisfactorily high.

The dilemma facing those who have attempted the development of tractable, high HDT, hydroquinone/benzene dicarboxylic acid/p-hydroxybenzoic acid copolyesters is perhaps best illustrated by Example 1 of Cottis et al., U.S. Pat. No. 3,975,487. A polyester having excellent properties, based upon a 1:3 molar ratio of isophthalic:terephthalic acids, p-hydroxybenzoic acid, and 4,4'-biphenol was prepared. When this example was repeated using hydroquinone in place of biphenol and all isophthalic acid as the dicarboxylic acid, a polymer having poorer properties (i.e., a lower tensile strength and a lower modulus) was obtained (column 10, lines 60-63).

Copolyesters based on p-hydroxybenzoic acid (PHBA), hydroquinone (HQ), isophthalic (IA) and terephthalic (TA) acids are disclosed in Cottis et al., U.S. Pat. No. 3,637,595. The subject patent shows one example in which a resin incorporating all of the four monomers is described (example 10). The polymer was formed from 1.0 mole of PHBA, 0.5 moles of IA, 0.5 moles of TA, and 1.0 moles of HQ. It was poorly characterized; weight loss in air, at 752° F. was apparently high, indicating thermal stability problems. Our own characterization of the resin produced by the preferred process utilized in this invention (see "Experimental", Comparative Example 1) showed that it possessed a low melting point (325° C.); a low crystallization temperature (299° C.); and a low Tg (110° C.). Present indications are that if the polymer of Cottis et al. Example 10 had been produced by the process described in Example 10, it would have had even poorer properties than the polymer of Comparative Example 1 due to residual reaction solvent in the polymer functioning as a plasticizer, reducing the crystallization temperature further.

Thus, the elusive goal of developing a low cost hydroquinone-based crystalline polymer which (1) is melt-processible below the decomposition temperature of about 415° C., (2) has a melting point in the range of 340° to 400° C.; a crystallization temperature of 300° to 340° C.; and a crystallization rate of at least 1,000 counts per minute; and which (3) when filled with 30 percent by weight of glass fibers has an HDT of at least 240° C., has not been achieved in the prior art. In fact, based on the prior art, it appears unlikely that polymers having these properties can be produced, particularly polymers consisting essentially of units (I), (II), (III), and (IV).

It is the general object of the present invention to provide novel, inexpensive, melt-processible hydroquinone poly(iso-terephthalates) containing residues of p-hydroxybenzoic acid, which form a highly tractable oriented melt phase; and which are capable of melt extrusion to form quality high performance fibers, films, three-dimensional molded articles, etc.

It is a further object of the present invention to provide novel, melt-processible hydroquinone poly(isoterephthalates) containing residues of p-hydroxybenzoic acid, which form a melt phase below 400° C. in the substantial absence of polymer degradation, unlike many other polymers which include relatively high concentrations of the 4-oxybenzoyl moiety.

Finally, it is an object of the present invention to provide novel, melt-processible hydroquinone poly(isoterephthalates) containing residues of p-hydroxybenzoic acid, which are capable of forming products exhibiting high modulus and strength in combination with other desirable properties such as retention of properties at elevated temperatures and high HDT's (from about 240° to about 280° C.).

These and other objects, as well as the scope, nature and utilization of the invention will be apparent to those skilled in the art from the following detailed description.

THE INVENTION

It was unexpectedly discovered that copolyesters, consisting essentially of units (I), (II), (III), and (IV).

where p is approximately equal to q+r; the values of p, q, r and s are as hereinbelow defined; and having molecular weights in the range of from about 2,000 to about 200,000, display an outstanding combination of properties. The subject resins form a stable oriented melt phase at 340° to 400° C., preferably from 340° to 380° C.; the melt phase is tractable and can be melt-extruded below its decomposition temperature to form quality high performance fibers, films, molded articles, and the like. Fabricated products show high modulus and strength as well as good retention of properties at high temperatures. Materials filled with 30 percent by weight of glass fiber have heat distortion temperatures of from about 240° to about 280° C., under a load of 264 psi. In addition, the crystallization temperatures of the subject copolymers are in the range of from 300° to 340° C., preferably from 310° to 340° C.; and their crystallization rates are at least 1,000 and up to 3,500 counts per minute, preferably from 1,500 to 2,000 counts per minute.

The novel copolymer compositions which combine the above-mentioned outstanding properties are plotted in the triangular phase diagram FIG. I. The diagram shows two compositional areas of interest, the lower area A and the upper area B. The coordinates for each point of these areas define a copolyester in terms of molar percentages of p-oxybenzoyl, hydroquinone terephthaloyl and hydroquinone isophthaloyl units. Parameters p, q, r, and s can then be calculated from the above using methods known in the art. Materials falling within the group represented by A are preferred. As indicated above, the properties of the polymer are somewhat dependent on the method of synthesis. It should be noted that the criterion for borderline compositions on the phase diagram is that the HDT as measured on 30 percent glass filled products under a load of 264 psi is about 240° to about 280° C. Accordingly, those polymers which are melt-processable and which yield HDT's of from about 240° C. to about 280° C. are considered as falling within the scope of the instant invention.

It is important to point out that melting points, HDT's, crystallization temperatures and crystallization rates are basic property parameters that determine polymer performance. Thus, a very high melting point above 400° C. results in materials that are either difficult to melt-fabricate or plain intractable (vide supra). Low melting points below 340° C. lead to resins having low HDT's. High heat distortion temperatures are very important since they indicate the upper temperature at which the particular polymer is useful, especially in structural applications.

As indicated earlier, two additional, very important and very useful characteristics of the instant copolyesters are their crystallization temperature and crystallization rate. By crystallization temperature is meant the temperature at which onset of crystallization takes place; it is generally in the range of from 300° to 340° C. preferably from 310° to 340 ° C. The crystallization rate is expressed as an increase in counts per minute as measured by X-ray techniques (see below); this increase is of the order of at least 1000 to 3500 counts per minute, preferably of from 1500 to 2000 counts per minute. Crystallization temperatures and rates of crystallization are related to the degree of crystallinity of the material. If these two parameters are low, the desirable structural and high temperature characteristics of the polyester develop slowly; the resin is not adequate for injection molding applications where parts with desirable characteristics must be produced at economically acceptable production rates. On the other hand, if the above two parameters are too high, standard molding of the polymer becomes difficult and more severe fabrication conditions (e.g., higher temperatures), or techniques such as compression molding, impact molding or plasma spraying have to be utilized.

Melting points, crystallization temperatures and rates of crystallization were determined using X-ray techniques. A brief description of these techniques follows.

The crystalline melting point is measured by following the intensity of the X-ray reflection of the most intensive peak as a function of temperature. The most intensive diffraction peak is located at a spacing of about 4.5A. Based on literature data [J.Polymer Sci., Polym. Chem. Ed., 14, 2207 (1976); J.Polymer Sci., Polym. Chem. Ed., 21, 2249 (1983)] the subject peak has been tentatively assigned to the distance between the polymer chains. The point at which the intensity reaches a minimum is taken for the polymer melt temperature. The rate of temperature change is 100° C. per minute.

The onset of crystallization is taken as the temperature at which there is a sharp increase in the intensity of the X-ray peak referred to above. Again, the rate of cooling is 100° C. per minute.

Crystallization rate is defined as the difference between the intensities of the above X-ray peak at the crystallization temperature and at 40° C. below that temperature, the rate of cooling being 100° C. per minute.

A detailed description of the three methods is given in the Experimental. Note that throughout this patent, all melting and crystallization data refer to the second heating/cooling cycle of the sample (see Experimental).

It is important to point out that the instant invention does not reside in the use of novel monomers; the critical factor of the present invention is the discovery that polymers having the particular combination of physical properties can be obtained when the four monomers, i.e., p-hydroxybenzoic acid (PHBA), hydroquinone (HQ), isophthalic acid (IA), and terephthalic acid (TA), are used in certain amounts and are produced by the preferred method.

The metes and bounds of the present invention have been defined by the circumscribed areas of A and B in FIG. I in conjunction with the aforementioned physical properties.

While it is difficult to calculate a numerical range of monomer units, for convenience, the following ratios are given: The most preferred type of polymers are depicted in area A and have the following approximate monomer ranges: $s \approx 0.25$ to 0.55, $q \approx 0.50$ to 0.70 and $r \approx 0.30$ to 0.50. The lesser preferred polymers are depicted in area B and have the following approximate monomer ranges: $s \approx 0.55$ to 9.0, $q \approx 0$ to 0.80 and $r \approx 0.2$ to 1.0. It is to be noted that there may be polymers that fall within areas A and B and in the above ranges that would be outside of the scope of the present invention as defined by the physical properties required (i.e., a melting point range of about 340° C. to 400° C., a crystallization temperature of 300° to 340° C. and crystallization rate of at least 1,000 counts/min and an HDT of 240° to 280° C. under a load of 264 psi for 30 wt % glass fiber filled). As indicated earlier, the compositional areas which cover the materials of this invention are depicted on the attached triangular phase diagram FIG. I. Clearly, their existence was not anticipated nor predicted by the existing prior art.

The synthesis of the polyesters of the instant invention is described generally in Cottis et al., U.S. Pat. No. 3,637,595 entitled "P-Oxybenzoyl Copolyesters" and in Finestone, U.S. Pat. No. 4,742,149 entitled "Production of Melt Consistent Aromatic Polyesters"; the disclosure of the aforementioned two patents is incorporated herein by reference.

The bulk condensation of aromatic polyesters is described in the patent literature and broadly considered involves an alkanoylation step in which a suitable dicarboxylic acid, hydroxybenzoic acid and diol are reacted with an acid anhydride; a prepolymerization step in which the reaction product of the first step is polycondensed to prepare a prepolymer; and the prepolymer is thereafter heated in a third step to produce a polycondensate of the desired degree of polymerization.

Thus, in somewhat greater detail, the instant copolyesters are prepared by charging into the reactor the required amounts of isophthalic and terephthalic acids, p-hydroxybenzoic acid and hydroquinone. An anhydride of a lower monocarboxylic acid, preferably an anhydride of a $C_2$ to $C_4$ monocarboxylic acid, is added in at least stoichiometric amounts. It is most preferred to use acetic anhydride; its amount is preferably from about 5 to about 20 mole percent over that required for the acetylation of all of the hydroxyl groups. The acetylation reaction takes place at about 140° C. for a period of time of from about 2 to about 6 hours. The reaction mixture is then heated to about 240°-320° C. at a rate of about 20° to 40° C. per hour, and is kept at about 240° to 320° C. for approximately a few minutes to about 4 additional hours. The low molecular weight polymer obtained is then solid state advanced to the required high molecular weight by heating to a temperature of from about 290° to about 340° C., for a period of time of from about one to about 24 hours.

A preferred variant as described in Finestone, U.S. Pat. No. 4,742,149, comprises adding a salt, particularly an alkaline earth metal salt or an alkali metal salt, preferably potassium sulfate, during the preparation of the resin and, particularly to the prepolymer melt prior to advancement of the final product to the desired degree of polymerization. The incorporation of stabilizing amounts of phosphites, as described in Cottis, U.S. Pat. No. 4,639,504 is also advantageous.

The polyesters of the present invention commonly exhibit end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester or methyl ester optionally can be included at the end of the polymer chains.

The polymers can be annealed below their melting points for a period of time; or the polymers may be oxidatively crosslinked to at least some degree, if desired, by heating in an oxygen-containing atmosphere (e.g., in air) while in bulk form or as a previously shaped article at a temperature below their melting points for a limited period of time (e.g., for a few minutes).

The polyesters of the present invention tend to be substantially insoluble in all common polyester solvents such as hexafluoroisopropanol and o-chlorophenol, and accordingly are not susceptible to solution processing. They can surprisingly be readily processed by known melt processing techniques as discussed hereafter.

The polyesters of the present invention commonly exhibit weight average molecular weights of about 2,000 to about 200,000, preferably about 10,000 to about 50,000 and most preferably about 20,000 to about 25,000. These molecular weights are determined by techniques that do not involve solutioning of the polymer, e.g., by end-group determination, and the like.

The instant polyesters can be melt processed in the substantial absence of polymer degradation to form a variety of relatively stiff shaped articles, e.g., molded three-dimensional articles, fibers, films, tapes, etc. The polyesters are suitable for molding applications and may be molded via standard injection molding techniques commonly utilized when forming molded articles. Unlike the polyesters commonly encountered in the prior art, it is not essential that more severe injection molding conditions (e.g., higher temperatures), compression molding, impact molding, or plasma spraying techniques be utilized. Fibers or films may be melt extruded. In some instances, as described in Cottis et al., U.S. Pat.

No. 4,563,508, melt fabrication may be facilitated by adding flow aids.

Molding compounds may be formed from the subject copolyesters by incorporating therein fillers such as talc, wollastonite or titanium dioxide; and/or reinforcing agents, e.g., glass fibers. One attractive application of the novel copolyesters of the instant invention is, for example, in ovenware. Both, the neat polymers; or composites as disclosed by Duska et al., U.S. Pat. No. 4,626,557 are useful in this application. Molding compounds of interest in ovenware are described in commonly assigned U.S. Pat. application entitled "Novel Plastic Ovenware Compositions", Ser. No. (07/255,753) filed Oct. 11, 1988 concurrently with the present application.

The polymers of this invention may contain up to 10 mole percent (based on total reactants) of carbonate linkages and/or comonomers other than (I)–(IV), provided that the use of said carbonate linkages and/or comonomers does not unfavorably affect the very attractive properties of the instant copolyesters, i.e., (1) melt processibility below the decomposition temperature; (2) a melting point in the range of 340° to 400° C.; (3) a crystallization temperature of 300° to 340° C.; (4) a crystallization rate of at least 1,000 counts per minute; and (5) an HDT of at least about 240° C. as measured on compositions filled with 30 weight percent of glass fibers.

The novel copolyesters of the present invention yield particularly interesting blends with polyesters consisting essentially of units (V), (VI), (VII), and (VIII)

where a is approximately equal to b+c; b is in the range of from about 0.5 to about 0.8; c is in the range of from about 0.5 to about 0.2; d is in the range of from about 1 to about 7, preferably from about 2 to about 4; and where the molecular weight of said polyesters is from about 2,000 to about 200,000. Said blends display excellent mechanical and thermal properties, are easy to melt fabricate and yield molded parts having excellent surface characteristics. The addition of this polymer has the tendency to raise the HDT of the composition to permit the use of polymers somewhat deficient in HDT response. The novel blends are described in commonly assigned U.S. Patent application entitled "Polymer Compositions Having Improved Molding Characteristics", Ser. No. 07/255,632 ), filed Oct, 11, 1988 concurrently with the present application.

EXAMPLES

The following examples serve to give specific illustrations of the practice of this invention but they are not intended in any way to limit the scope of this invention. The examples and comparative examples are plotted on the triangular phase diagram.

A. EXPERIMENTAL PROCEDURES

The following procedures were used to obtain the data given in the examples.

A.1. X-RAY MEASUREMENTS a. Apparatus

X-ray diffraction data were obtained using a Philips XRG-3000 X-ray generator equipped with a vertical diffractometer, a long, fine focus copper X-ray tube, a Paar HTK-10 high temperature diffractometer attachment and a Paar HTK-heat controller. Diffractometer position is controlled by computer, which also measures and records radiation count rate produced by sample crystallinity, and sample temperature.

b. Determination of the Polymer Melting Point

A sample of the polymer is submitted to a preliminary X-ray diffraction scan between 15 and 25 degrees two-theta angle by increasing the temperature by increments of 60° C. within a temperature range from about 200° to about 480° C. This allows determination of the approximate temperature at which the peak located at approximately 19.7 degrees two-theta (4.50 Angstroms d-spacing) reaches its minimum value, i.e., an approximate melting point. A second-degree polynomial equation is derived from the above data; this polynomial equation now allows to follow the peak angle as the sample temperature is varied. The temperature at which the peak height reaches a minimum (i.e., touches the baseline), is considered to be the melting point. The polymer sample is now heated and cooled at a rate of 100° C. per minute between the previously mentioned temperature limits, and its melting point is determined. Since the melting point of a crystalline material often changes on heating and cooling (due to recrystallization, further polymerization, etc.), the sample is cooled and reheated. This allows determination of the melting point on the second heating cycle. Generally, the second cycle yields a melting point which remains approximately constant if additional heating or cooling cycles are performed. Therefore, the value obtained in the second heating cycle is taken as the polymer melting point.

c. Crystallization Temperature

Onset of Crystallization

The onset of crystallization is measured in the same manner except that the scanning (for details, see above), is performed while the sample is cooled at 100° C. per minute. The temperature at which the peak emerges from the baseline during the second cooling cycle is considered as the onset of crystallization.

d. Crystallization Rate

At every temperature below the sample melting point, the intensity of X-ray diffraction of a crystalline material can be expressed as counts per second (or any unit of time). The increase in the number of counts per unit of time while the sample is being cooled at a certain rate (100° C. per minute) is therefore proportional to the rate of crystallization. A temperature interval starting at the onset of crystallization and 40° C. below that temperature was arbitrarily chosen. Rates of crystallization are expressed as the increase in counts per minute for a sample cooled within these temperature limits during the second cooling cycle.

A.2. DMA FLEXURAL MODULUS

The measurement is performed using a Dupont Dynamic Mechanical Analyzer (DMA), Model 982 in conjunction with a thermal analyzer, Model 1090. The DMA measures changes in the viscoelastic properties of materials as a function of time and temperature. Tests are conducted at a heating rate of 5° C. per minute. When the run is complete, the stored data is analyzed; the storage modulus (very similar to the flexural modulus) and the loss modulus are calculated and plotted as a function of temperature. The modulus is expressed in GPa's and the temperature in degrees Centigrade. Conversion into psi's is performed using the equation:

Modulus (psi) = Modulus (GPa) × (1.45.10$^5$).

A.3. MISCELLANEOUS

The flexural strength of the experimental samples was measured according to the procedure of ASTM D-790-84A; and HDT (DTUL) data were obtained using the method as described in ASTM D648.

B. POLYMERIZATIONS

EXAMPLE 1.

This is an example of the synthesis of a novel polyester based on terephthalic acid, isophthalic acid, p-hydroxybenzoic acid, and hydroquinone in the nominal mole ratio of 0.6:0.4:0.5:1. The following ingredients were combined in the manner described.

| Item | Ingredient | Amount |
|---|---|---|
| A | Terephthalic acid | 5.311 Kg |
| B | Isophthalic acid | 3.541 Kg |
| C | p-Hydroxybenzoic acid | 3.680 Kg |
| D | Hydroquinone | 5.868 KG |
| E | Acetic Anhydride | 15.645 Kg |
| F | Magnesium acetate tetrahydrate | 0.46 gram |
| G | Triphenyl phosphite | 7.36 gram |

Items A through F were charged to a 15-gallon, oil heated vessel equipped with an anchor type stirrer, reflux condenser, after condenser, injection port, and distillate receiver. After purging with nitrogen, the contents were heated with stirring to 141° C. and held under reflux at that temperature for 3 hours. Distillation was then started while increasing the temperature over a 4.8 hour period to 285° C. Item G was then injected into the vessel. After an additional 15 minutes the contents of the vessel were transferred to a sigma blade mixer that had been preheated to 320° C. After mixing for 4 hours at this temperature under an atmosphere of nitrogen, the mixer was cooled to near room temperature where the contents were removed as a granular solid.

The melting point of the polymer (X-ray) was 359° C.; its crystallization temperature was 336° C. with a crystallization rate of 2400.

A sample of the polymer was melted, extruded, and pelletized with a twin screw extruder. The pellets were molded into test specimens. The resulting testing showed superior high temperature performance with a heat distortion temperature of 250° C. and a flexural modulus of 570,000 psi as measured at 250° C. by DMA.

A molding composition containing 70 weight percent of the above polymer and 30 weight percent of milled glass fiber was prepared by compounding on a twin screw extruder and molded into test specimens. The heat distortion temperature of the obtained composite was 264° C. and its flexural modulus (by DMA) was 520,000 psi as measured at 250° C.

EXAMPLE 2

The ingredients were the same as in Example 1 with the exception that the amount of item F was 14.16 grams, and that item G was not used in the preparation. The equipment was the same as in example 1 and the operating procedure is described below.

After purging with nitrogen, the contents were heated with stirring to 141° C. and held under reflux at that temperature for 3 hours. Distillation was then started with increasing the temperature over a 3.6 hour period to 250° C. The reaction mixture was then stirred for 1 hour at 250°-260° C.

The contents of the vessel were transferred to a sigma blade mixer which had been preheated to about 250° C. The material was mixed while the temperature was increased to 300° C. and mixing was continued for a total of 5 hours at that temperature.

A molding composition containing 70 weight percent of the above polymer and 30 weight percent of milled glass fiber was prepared by compounding on a twin screw extruder and molded into test specimens. The heat distortion temperature of the obtained composite was 250° C. and its flexural modulus (by DMA) was 420,000 psi as measured at 250° C.

EXAMPLE 3

The ingredients were the same as in Example 2 with the exception of item F the amount of which was 7.08 grams; also, 16.00 grams of triphenyl phosphite were added prior to transfer of the reaction mixture to the sigma blade mixer. Otherwise, the procedure was the same as in Example 2.

The melting point of the polymer (X-ray) was 359° C.; its crystallization temperature was 329° C. with a crystallization rate of 2500.

A molding composition containing 70 weight percent of the above polymer and 30 weight percent of milled glass fiber was prepared by compounding on a twin screw extruder and molded into test specimens. The heat distortion temperature of the obtained composite was 268° C. and its flexural modulus (by DMA) was 480,000 psi as measured at 250° C.

EXAMPLE 4

This is an example of the synthesis of a novel polyester based on terephthalic acid, isophthalic acid, p-hydroxybenzoic acid, and hydroquinone in the nominal mole ratio of 0.6:0.4:0.75:1. The following ingredients were combined in the manner described:

| Item | Ingredient | Amount |
|---|---|---|
| A | Terephthalic acid | 4.829 Kg |
| B | Isophthalic acid | 3.219 Kg |
| C | p-Hydroxybenzoic acid | 5.018 Kg |
| D | Hydroquinone | 5.334 KG |
| E | Acetic Anhydride | 15.645 Kg |

-continued

| Item | Ingredient | Amount |
|------|------------|--------|
| F | Magnesium acetate tetrahydrate | 0.46 gram |
| G | Triphenyl phosphite | 7.36 gram |

These ingredients were processed as described in Example 1.

The melting point of the polymer (X-ray) was 353° C.; its crystallization temperature was 331° C. with a crystallization rate of 2100.

A molding composition containing 70 weight percent of the above polymer and 30 weight percent of milled glass fiber was prepared by compounding on a twin screw extruder and molded into test specimens. The heat distortion temperature of the obtained composite was 240° C.

COMPARATIVE EXAMPLE 1

This examples describes the preparation of a polyester having the molar composition: terephthalic acid/isophthalic acid/p-hydroxybenzoic acid/hydroquinone 0.5/0.5/1.0/1.0 (see Cottis et al., U.S. Pat. No. 3,637,595; example No. 10). The properties of this polymer do not meet the requirements of the polyesters of the instant invention.

A 5-liter resin flask equipped with a stirrer, condenser system designed both for reflux and distillation, and a heating mantle was charged with the following:

1,092.5 g of p-hydroxybenzoic acid;
657.1 g of terephthalic acid;
657.1 g of isophthalic acid;
871.0 g of hydroquinone; and
2,786.0 g of acetic anhydride.

The above mixture was heated at reflux for a period of 3 hours; vigorous stirring was maintained throughout the reaction. At the end of the reflux period collection of distillate was started. The reaction mass was then heated at a rate of about 30° C. per hour to 311° C. at which point 98.2 percent of the theoretical distillate was collected. The molten material was poured into an aluminum pan and allowed to cool to room temperature. The solid was pulverized and ground to pass a 2-millimeter screen. The powder was placed in a drum and was heated in a nitrogen stream, while rotating, to a temperature of 330° C.; and held at that temperature for two hours. The product was removed from the drum after cooling.

The melting point of the polymer (X-ray) was 325° C.; its crystallization temperature (onset of crystallization) and crystallization rate (both measured via X-ray techniques) were 299° C. and 2,242, respectively.

A portion of the product was pelletized and injection molded into test specimens. The heat distortion temperature of the neat polymer was 233° C.

Another portion of the product was compounded with milled glass fiber to prepare a pelletized material containing 30 percent glass. Injection molding yielded test specimens having a heat distortion temperature of 226° C.

Additional materials that were prepared are listed in Tables I, II, and III.

Table I lists the polyesters whose properties meet the specifications of the instant invention as far as melting point, crystallization temperature and crystallization rate are concerned.

Table II lists borderline resins, i.e., those where (a) at least one of the three basic properties (melting point, crystallization temperature and crystallization rate—all as measured by X-ray techniques) is within the required range, the other two properties being outside of the range, but very close to it; or (b) where all three properties are in the required range, but either the HDT does not satisfy the requirements and/or the material is not moldable.

Table III lists polymers whose properties are outside of the specifications of this invention.

The data clearly show that well defined ratios of monomers are critical if one wants to achieve polyesters having the outstanding characteristics as described in this application.

TABLE I

| Example No. (a) | Composition | | | Properties | | |
|---|---|---|---|---|---|---|
| | q | r | s | Melting Point (°C.) | Cryst. Temp. (°C.) | Cryst. Rate (b) |
| 5 | 0.20 | 0.80 | 5.00 | 340 | 316 | 2000 |
| 6 | 0.50 | 0.50 | 2.00 | 367 | 334 | 2473 |
| 7 | 0.50 | 0.50 | 1.25 | 351 | 315 | 2500 |
| 8 | 0.60 | 0.40 | 0.60 | 366 | 329 | 2420 |
| 9 | 0.538 | 0.462 | 0.538 | 341 | 308 | 1350 |
| 10 | 0.571 | 0.429 | 0.429 | 384 | 325 | 1636 |
| 11 | 0.60 | 0.40 | 0.333 | 357 | 330 | 3115 |
| 12 | 0.53 | 0.47 | 0.333 | 343 | 300 | 2210 |
| 13 | 0.60 | 0.40 | 0.250 | 393 | 331 | 1920 |

(a) The polymers were prepared via methods similar to that used in comparative Example 1. In all of the examples, p is one.
(b) Counts per minute.

TABLE II

| Comparative Example No.(a) | Composition(c) | | | Properties | | | Remarks(d) |
|---|---|---|---|---|---|---|---|
| | q | r | s | Melting Point (°C.) | Cryst. Temp. (°C.) | Cryst. Rate(e) | |
| 2 | 0.30 | 0.70 | 7.00 | 393 | 359 | 3100 | — |
| 3 | 0.20 | 0.80 | 7.00 | 393 | 359 | 3100 | — |
| 4 | 0.10 | 0.90 | 7.00 | 370 | 343 | 2600 | — |
| 5 | 0.00 | 1.00 | 7.00 | 353 | 323 | 2100 | Poor processibility HDT = 219° C. |
| 6 | 0.40 | 0.60 | 5.00 | 389 | 352 | 2800 | — |
| 7 | 0.30 | 0.70 | 5.00 | 373 | 341 | 2700 | — |
| 8(b) | 0.50 | 0.50 | 1.50 | 343 | 313 | 2500 | Neat polymer fused at 450° C. with decomposition (smoke) when compounding was attempted. |
| 9 | 0.60 | 0.40 | 1.25 | 387 | 347 | 2810 | — |
| 10(b) | 0.60 | 0.40 | 1.00 | 361 | 335 | 2700 | Same as Comparative Ex. 8 |
| 11 | 0.50 | 0.50 | 1.00 | 334 | 300 | 1794 | — |
| 12 | 0.60 | 0.40 | 1.00 | 389 | 341 | 3200 | — |

TABLE II-continued

| Comparative Example No.[a] | Composition[c] q | r | s | Melting Point (°C.) | Cryst. Temp. (°C.) | Cryst. Rate[e] | Remarks[d] |
|---|---|---|---|---|---|---|---|
| 13 | 0.50 | 0.50 | 0.75 | 362 | 291 | 2000 | — |
| 14 | 0.55 | 0.45 | 0.60 | 333 | 311 | 1510 | — |
| 15 | 0.615 | 0.385 | 0.538 | 381 | 344 | 3860 | — |
| 16 | 0.643 | 0.357 | 0.429 | 400 | 351 | 2500 | — |
| 17 | 0.50 | 0.50 | 0.429 | 334 | 294 | 2110 | — |
| 18 | 0.47 | 0.53 | 0.333 | 366 | 304 | 820 | — |
| 19 | 0.00 | 1.00 | 0.10 | 387 | 309 | 430 | — |

[a]Prepared in a manner similar to that of Comparative Example 1, except where otherwise indicated.
[b]Prepared in a manner similar to that of Example 1.
[c]In all examples p is equal to one.
[d]HDT measured on 30 percent by weight milled glass filled compositions.
[e]Counts per minute.

TABLE III

| Comparative Example No.[a] | Composition[c] q | r | s | Melting Point (°C.) | Cryst. Temp. (°C.) | Cryst. Rate[f] | Remarks[d] |
|---|---|---|---|---|---|---|---|
| 20 | 1.00 | 0.00 | 7.00 | 486 | 445 | 4200 | Could not compound or mold. |
| 21 | 0.80 | 0.20 | 7.00 | 433 | 413 | 4706 | — |
| 22 | 0.70 | 0.30 | 7.00 | 453 | 410 | 5400 | — |
| 23 | 0.60 | 0.40 | 7.00 | 437 | 399 | 5100 | — |
| 24 | 0.50 | 0.50 | 7.00 | 428 | 389 | 4800 | — |
| 25 | 0.40 | 0.60 | 7.00 | 419 | 380 | 4200 | — |
| 26 | 1.00 | 0.00 | 5.00 | 497 | 456 | 4700 | Could not compound or mold. |
| 27 | 0.80 | 0.20 | 5.00 | 460 | 427 | 4600 | — |
| 28 | 0.70 | 0.30 | 5.00 | 443 | 403 | 4200 | — |
| 29 | 0.60 | 0.40 | 5.00 | 448 | 388 | 4500 | — |
| 30 | 0.50 | 0.50 | 5.00 | 413 | 376 | 3200 | — |
| 31[b] | 0.35 | 0.65 | 5.00 | — | — | — | Heavy smoke and decomposition during extrusion. |
| 32 | 0.10 | 0.90 | 5.00 | 324 | 300 | 2200 | — |
| 33 | 0.00 | 1.00 | 5.00 | 298 | 296 | 310 | — |
| 34 | 1.00 | 0.00 | 4.00 | 492 | 458 | 3300 | — |
| 35 | 1.00 | 0.00 | 3.00 | 497 | 460 | 3500 | Could not compound or mold. |
| 36 | 0.90 | 0.10 | 3.00 | 492 | 452 | 6740 | — |
| 37 | 0.80 | 0.20 | 3.00 | 468 | 431 | 6410 | — |
| 38 | 0.70 | 0.30 | 3.00 | 446 | 406 | 6620 | — |
| 39 | 0.60 | 0.40 | 3.00 | 369 | 408 | 4550 | — |
| 40 | 0.00 | 1.00 | 3.00 | 204 | 204 | 617 | Processing marginal; HDT = 175° C.[d]. |
| 41 | 0.00 | 1.00 | 2.50 | Weak | Weak | Weak | Processing adequate; HDT = 163° C.[d]. |
| 42 | 1.00 | 0.00 | 2.00 | 520 | 481 | 6700 | Could not compound or mold. |
| 43 | 0.70 | 0.30 | 2.00 | 415 | 398 | 5000 | — |
| 44 | 0.60 | 0.40 | 2.00 | 405 | 368 | 5066 | — |
| 45 | 0.40 | 0.60 | 2.00 | 329 | 300 | 1789 | — |
| 46 | 0.30 | 0.70 | 2.00 | 299 | 269 | 1368 | — |
| 47 | 0.20 | 0.80 | 2.00 | 300 | 248 | 842 | — |
| 48 | 0.00 | 1.00 | 2.00 | Weak | Weak | Weak | Processing adequate; HDT = 175° C.[d]. |
| 49 | 0.00 | 1.00 | 1.75 | 400 | 368 | 208 | Processing adequate; HDT = 142° C.[e]. |
| 50[b] | 0.75 | 0.25 | 1.50 | 440 | 404 | 4200 | Decomposed; did not melt. |
| 51[b] | 0.67 | 0.33 | 1.50 | 413 | 377 | 4200 | Neat polymer fused at 450° C. w/decomposition (smoke) when compounding was attempted. |
| 52 | 0.60 | 0.40 | 1.50 | 387 | 353 | 2500 | As above. |
| 53 | 0.40 | 0.60 | 1.50 | 289 | 279 | 962 | — |
| 54 | 0.30 | 0.70 | 1.50 | 249 | 240 | 850 | Processing marginal; HDT = 218° C.[e]. |
| 55 | 0.20 | 0.80 | 1.50 | 231 | 223 | 490 | — |
| 56 | 0.10 | 0.90 | 1.50 | Weak | Weak | Weak | — |
| 57 | 0.00 | 1.00 | 1.50 | — | — | — | Processing adequate; HDT = 187° C.[e]. |
| 58 | 0.70 | 0.30 | 1.25 | 428 | 392 | 6068 | — |
| 59 | 0.40 | 0.60 | 1.25 | 304 | 272 | 1375 | — |

TABLE III-continued

| Example No.[a] | Comparative Composition[c] | | | Properties | | | Remarks[d] |
|---|---|---|---|---|---|---|---|
| | q | r | s | Melting Point (°C.) | Cryst. Temp. (°C.) | Cryst. Rate[f] | |
| 60 | 0.30 | 0.70 | 1.25 | 267 | 260 | 588 | — |
| 61 | 1.00 | 0.00 | 1.00 | 523 | 490 | 2700 | Could not be compounded or molded. |
| 62 | 0.80 | 0.20 | 1.00 | 466 | 432 | 4100 | — |
| 63 | 0.70 | 0.30 | 1.00 | 440 | 392 | 2000 | — |
| 64 | 0.40 | 0.60 | 1.00 | 256 | 251 | 900 | — |
| 65 | 0.30 | 0.70 | 1.00 | 235 | 235 | 350 | — |
| 66 | 0.20 | 0.80 | 1.00 | Weak | Weak | Weak | — |
| 67 | 0.10 | 0.90 | 1.00 | Weak | Weak | Weak | — |
| 68 | 0.00 | 1.00 | 1.00 | Weak | Weak | Weak | — |
| 69 | 0.80 | 0.20 | 0.75 | 464 | 430 | 6820 | — |
| 70 | 0.70 | 0.30 | 0.75 | 421 | 382 | 5000 | — |
| 71 | 0.40 | 0.60 | 0.75 | 298 | 272 | 580 | — |
| 72 | 0.20 | 0.80 | 0.75 | 342 | Weak | Weak | — |
| 73 | 0.00 | 1.00 | 0.75 | 334 | 334 | 160 | — |
| 74 | 0.462 | 0.538 | 0.538 | 339 | 290 | 763 | — |
| 75 | 1.00 | 0.00 | 0.50 | 592 | 534 | 3420 | — |
| 76 | 0.30 | 0.70 | 0.50 | 391 | 391 | 69 | — |
| 77 | 0.00 | 1.00 | 0.50 | 376 | 285 | 150 | — |
| 78 | 0.80 | 0.20 | 0.25 | 471 | 438 | 4300 | — |
| 79 | 0.70 | 0.30 | 0.25 | 421 | 370 | 3100 | — |
| 80 | 0.50 | 0.50 | 0.25 | 425 | 317 | 100 | — |
| 81 | 0.30 | 0.70 | 0.25 | 374 | 325 | 71 | — |
| 82 | 0.00 | 1.00 | 0.25 | 354 | 243 | 113 | — |
| 83 | 0.61 | 0.39 | 0.22 | 420 | 343 | 1292 | — |
| 84 | 0.41 | 0.59 | 0.18 | 420 | Weak | Weak | — |
| 85 | 0.70 | 0.30 | 0.10 | 432 | 396 | 2090 | — |
| 86 | 0.50 | 0.50 | 0.10 | 400 | 350 | 600 | — |
| 87 | 0.30 | 0.70 | 0.10 | Weak | Weak | Weak | — |
| 88 | 0.80 | 0.20 | 0.00 | 531 | 525 | 3400 | — |
| 89 | 0.70 | 0.30 | 0.00 | 540 | 504 | 4300 | — |
| 90 | 0.10 | 0.90 | 0.00 | 402 | 338 | 120 | — |

[a]Polymers were prepared in a manner similar to that of Comparative Example 1, except where noted.
[b]Prepared as described in Example 1.
[c]In all examples p is equal to 1.
[d]Measured on a 37 weight percent talc filled composition.
[e]Measured on a 30 weight percent milled glass filled composition.
[f]Counts per minute.

We claim:

1. A high modulus, high strength melt processable copolyester consisting essentially of recurring units (I), (II), (III) and (IV):

(I)  (II)

(III)  (IV)

wherein said copolyester has a melting point in the range of from about 340° C. to 400° C., a crystallization temperature of from about 300° C.–340° C., and a crystallization rate of at least 1,000 counts/minute.

2. The polyesters of claim 1 further comprising about 30 weight glass fiber and having a heat distortion temperature of about 240° C. to about 280° C. under a load of 264 psi.

3. The polyester of claim 1 wherein the sum of the number of units of (II) and (III) is approximately equal to the number of unit (I) and the ratio of unit (IV) ranges from about 0.25 to 0.55.

4. The polyester of claim 1 wherein the sum of the number of units of (II) and (III) is approximately equal to the number of unit (I) and the ratio of unit (IV) ranges from about 0.50 to 9.0.

5. A melt processable composition comprising from about 1 to 19 parts by weight of the polyester of claim 1 per 1 part by weight of a polyester comprising recurring units (V), (VI), (VII) and (VIII).

(V)

(VI)

(VII)

where a is approximately equal to b+c; b is in the range of from about 0.5 to about 0.8; c is in the range of from about 0.50 to about 0.2; d is in the range of from about 1 to about 7, and where the number average molecular weight of said polyesters is from about 2,000 to about 200,000.

6. The method of preparing the copolyester of claim 1 which comprises reacting hydroquinone, isophthalic acid, terephthalic acid and hydroxybenzoic acid in a solvent comprising an anhydride of a lower monocarboxylic acid.

7. The process of claim 6 wherein said reaction is carried out in the presence of a salt selected from the group consisting of an alkaline earth metal salt and an alkali metal salt.

8. A high modulus, high strength melt-processable polyester consisting essentially of recurring units (I), (II), (III), and (IV):

having a melting point in the range of from about 340° C. -400 ° C., a crystallization temperature of 300°-340° C., a crystallization rate of at least 1,000 counts/minute; and when filled with 30 percent by weight glass fibers, has a Heat Distortion Temperature of at least 240° C. under a load of 264 psi.

Figure 1:
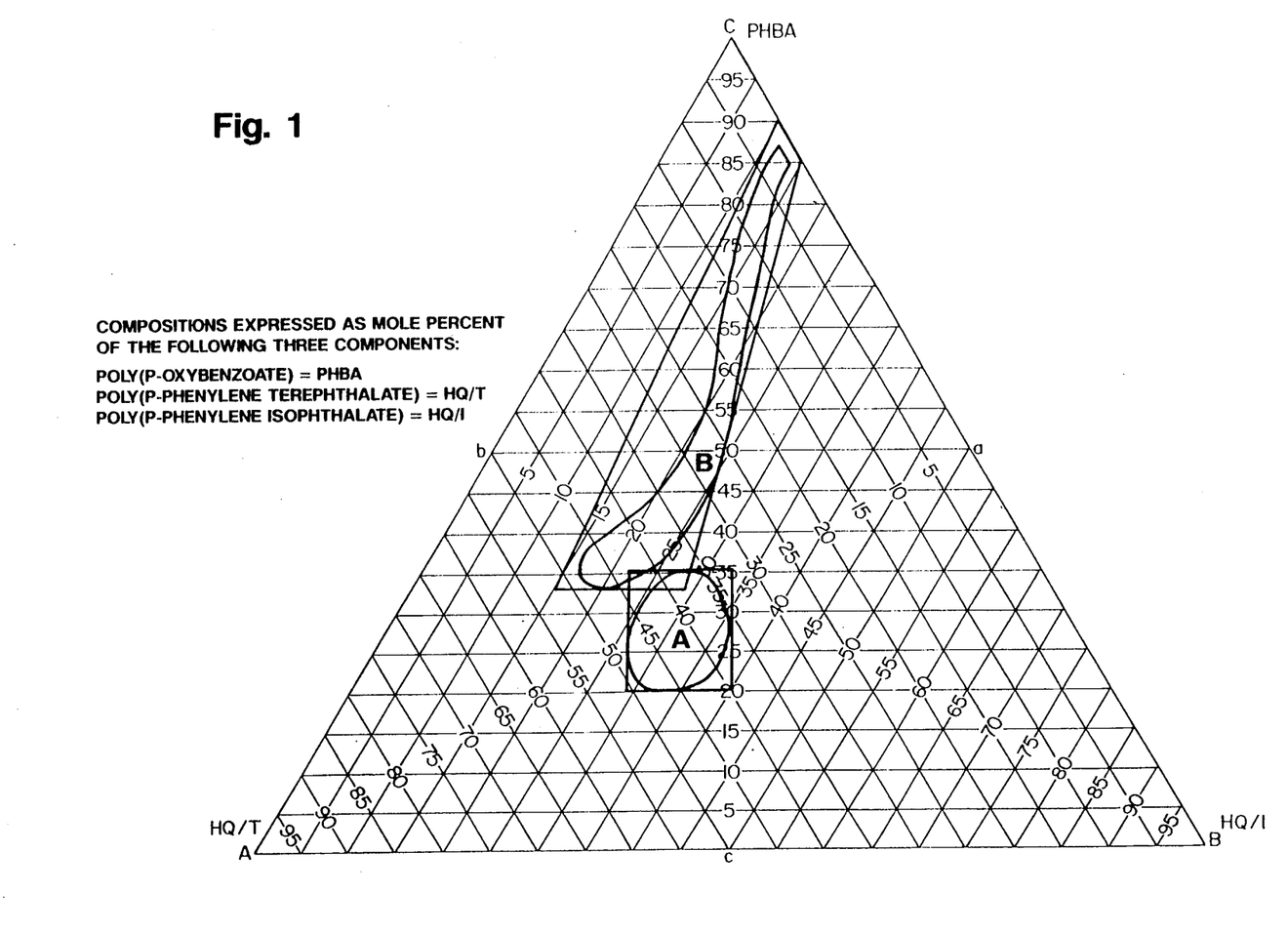

9. The polyester of claim 8 wherein the ratios of units (I), (II), (III) and (IV) are such that the composition of the polyester is defined by the rectilinear areas of triangular phase diagram FIG. 1 selected from the group consisting of rectilinear area A such that the ratios of (II) (III) and IV) are as follows:

, (II)≃0.05 to 0.70
, (III)≃0.30 to 0.50
, (IV)≃b 0.25 to 0.55 and of rectilinear area B such that the ratios of (II), (III) and (IV) are as follows;

, (II)≃0 to 0.80
, (III)≃0.2 to 1.0
, (IV)≃0.55 to 9.0.

10. The polyester of claim 9 wherein the ratios of units (I), (II), (III) and(IV) fall within the rectilinear area A of the triangular phase diagram FIG. 1. and are as follows:

, (II)≃0.50 to 0.70
, (III)≃0.30 to 0.50
, (IV)≃0.25 to 0.55.

11. The polyester of claim 8 wherein the sum of the number of units of (II) and (III) is approximately equal to (I) and the ratio of (IV) ranges from about 0.20 to 0.55.

12. The polyester of claim 8 wherein the sum of the number of units of (II) and (III) is approximately equal to (I) and the ratio of (IV) ranges from about 0.50 to 9.0.

13. A melt processable composition comprising from about 1 to 19 parts by weight of the polyester of claim 8 per 1 part by weight of the polyester comprising recurring units (V), (VI), (VII) and (VIII):

where a is approximately equal to b+c; b is in the range of from about 0.5 to about 0.8; c is in the range of from about 0.5 to about 0.2; d is in the range of from about 1 to about 7, preferably from about 2 to about 4; and where the molecular weight of said polyesters is from about 2,000 to about 200,000.

14. The method of preparing the polyester of claim 8 which comprises reacting hydroquinone, isophthalic acid, terephthalic acid and hydroxybenzoic acid in a solvent comprising an anhydride of a lower monocarboxylic acid.

* * * * *

UNITED STATES PATENT AND TRADEMARK OFFICE
CERTIFICATE OF CORRECTION

PATENT NO.: 5,097,001

DATED: 17 March 1992

INVENTOR(S): Richard Layton; James W. Cleary; Paul J. Huspeni; Paul D. Frayer

It is certified that error appears in the above-identified patent and that said Letters Patent is hereby corrected as shown below:

Patent reads:

| Col. | Line | | |
|------|------|---|---|
| 19 | 56 | "0.05 to 0.70" should read | --0.50 to 0.70--. |

Signed and Sealed this

Fifteenth Day of February, 1994

Attest:

BRUCE LEHMAN

Attesting Officer     Commissioner of Patents and Trademarks